United States Patent Office 3,132,144
Patented May 5, 1964

3,132,144
2-AMINO-6-IODOPURINE
George H. Hitchings, Yonkers, Gertrude B. Elion, Bronxville, and Irving Goodman, White Plains, N.Y., assignors to Burroughs Wellcome & Co. (U.S.A.) Inc., Tuckahoe, N.Y., a corporation of New York
No Drawing. Filed July 10, 1959, Ser. No. 826,139
1 Claim. (Cl. 260—254)

The present application relates to novel methods of preparing 2-amino-6-mercaptopurine (6-thioguanine). It also describes the synthesis of 2-amino-6-iodopurine, which is a valuable intermediate for the synthesis of 2-aminopurine derivatives, in particular thioguanine (U.S. Patent 2,884,667) and other 2-amino-6-thiopurine derivatives as illustrated in our pending application (U.S. application No. 720,560). For these purposes, it is much more useful than 2-amino-6-chloropurine, since the latter is unreactive and fails to undergo many of the desired reactions.

2-amino-6-iodopurine is conveniently prepared from 2-amino-6-chloropurine by the reaction of the latter with hydriodic acid in the cold.

2-amino-6-iodopurine is readily convertible to 2-amino-6-mercaptopurine by reaction with ammonium hydrosulfide solution at room temperature. Other reagents capable of yielding SH ion directly or indirectly may also be used. The hydrosulfides of the fixed bases furnish thioguanine directly.

Thioguanine also can be prepared from 2-amino-6-iodopurine by reacting the latter first with a sulfur-containing substance to produce a substituted thioguanine which cleaves spontaneously or can be cleaved to 2-amino-6-mercaptopurine. This is illustrated by the reaction of 2-amino-6-iodopurine with thiocyanates to produce 2-amino-6-thiocyanopurine, which, when dissolved in alkali, rapidly is converted to thioguanine. Similarly, the reaction of 2-amino-6-iodopurine with thioacetic acid and with thiourea, presumably gives intermediate S-substituted derivatives, but in these instances the intermediates are too unstable conveniently to be isolated and thioguanine is formed spontaneously under a variety of conditions. Other derivatives may be formed in which the conversion to thioguanine is more deliberate. This is illustrated by the reaction of 2-amino-6-iodopurine with benzylmercaptan to form 2-amino-6-benzylmercaptopurine (previously disclosed in U.S. application No. 533,866, filed Sept. 12, 1955, now abandoned, of which this application is a continuation-in-part). The latter is then cleaved by sodium in liquid ammonia to form thioguanine.

The following examples illustrate the teachings of this invention. Other examples are illustrated in copending U.S. application No. 720,560, filed March 11, 1958, now abandoned.

EXAMPLE 1

2-Amino-6-iodopurine

To 60 ml. of 47% hydriodic acid at 5° was added portionwise with stirring, 5.5 g. of 2-amino-6-chloropurine. The mixture was then stirred for 45 minutes at 0–5°, and another 20 minutes after removal from the ice bath. The mixture was filtered through a sintered glass funnel, the precipitate was suspended in 130 ml. of cold water and the mixture adjusted to pH 6 with ammonium hydroxide. The precipitate of 2-amino-6-iodopurine was collected, washed with water, alcohol and ether and dried in a vacuum desiccator (8 g.). The product shows an ultraviolet absorption spectrum with maxima at 322 m$\mu$ at pH 1 and 273, 315 m$\mu$ at pH 11.

EXAMPLE 2

2-Amino-6-thiocyanopurine

A mixture of 3 g. of 2-amino-6-iodopurine and 1.26 g. of potassium thiocyanate in 75 ml. of dimethylformamide was allowed to stand at room temperature in a stoppered flask for 3 days. The mixture was poured into 150 ml. of ice water and the precipitate of 2-amino-6-thiocyanopurine (2.2 g.) collected. After recrystallization from hot water, the product showed an ultraviolet absorption maximum at 323 m$\mu$ in dimethylformamide.

EXAMPLE 3

Unreactivity of 2-amino-6-chloropurine

A mixture of 1 g. of 2-amino-6-chloropurine and 0.68 g. potassium thiocyanate in 30 ml. dimethylformamide was kept in a stoppered flask at room temperature for 3 days. At the end of that time the 2-amino-6-chloropurine was unchanged. The mixture was then heated in a closed vessel at 70° for 18 hours. The ultraviolet absorption spectrum of the solution showed that no reaction had occurred.

EXAMPLE 4

2-amino-6-benzylmercaptopurine 2.72 grams of 2-amino-6-iodopurine and 1.5 g. of benzylmercaptan ($\alpha$-toluenethiol) were dissolved in 100 ml. of 0.2 N sodium hydroxide solution, and warmed at 60° for 3 hours. After cooling and acidification to a pH value of 5.0 with acetic acid, the 2-amino-6-benzylmercaptopurine was purified by recrystallization from 50% aqueous acetone. The compound melted at 205–207°.

EXAMPLE 5

2-amino-6-mercaptopurine

One gram of 2-amino-6-thiocyanopurine was dissolved in 5 ml. of 1 N sodium hydroxide. After 15 minutes the solution was diluted to 25 ml. and acidified to pH 5 with hydrochloric acid. The precipitate of thioguanine was collected, washed with water and dried in a vacuum desiccator.

EXAMPLE 6

2-amino-6-mercaptopurine

A solution of 1 g. of 2-amino-6-iodopurine in 10 ml. of 8% commercial ammonium hydrosulfide solution was allowed to stand in a stoppered flask at room temperature overnight. The solution was acidified to pH 5 with acetic acid and the precipitate of thioguanine, contaminated with sulfur, was collected. The thioguanine was purified by recrystallization from hot water.

EXAMPLE 7

2-amino-6-mercaptopurine

A mixture of 1.4 g. of 2-amino-6-iodopurine, 0.75 g. of thiourea, 20 ml. of dimethylformamide and 80 ml. of 95% ethanol was heated on the steam bath for 45 minutes in an open vessel. The solution was diluted to 150 ml. with water acidified to a pH value of 4, chilled and the precipitate of thioguanine (0.7 g.) filtered off.

EXAMPLE 8

2-amino-6-mercaptopurine

Five grams of 2-amino-6-benzylmercaptopurine were dissolved in 250 ml. of liquid ammonia. Small pieces of sodium were added with stirring, until the solution turned blue and remained that color for several minutes. The blue color, due to excess sodium, was discharged by the addition of a small amount of ammonium chloride and the solution was allowed to evaporate to dryness spontaneously. The residue was dissolved in 200 ml. of ether and 200 ml. of water and brought to a pH value of 9. The ether layer was removed and the aqueous layer brought to a pH value of 5 with acetic acid. Thioguanine (2.8 g.) precipitated and was collected.

What we claim is:
2-amino-6-iodopurine.

References Cited in the file of this patent

UNITED STATES PATENTS

| | | |
|---|---|---|
| 2,697,709 | Hitchings et al. | Dec. 21, 1954 |
| 2,724,711 | Hitchings et al. | Nov. 22, 1955 |
| 2,844,576 | Goldman et al. | July 22, 1958 |

FOREIGN PATENTS

| | | |
|---|---|---|
| 557,467 | Canada | May 13, 1958 |